United States Patent [19]

Schmidt et al.

[11] 4,454,626
[45] Jun. 19, 1984

[54] WIPING ARRANGEMENT FOR WINDOWS OF POWER VEHICLES

[75] Inventors: Lothar Schmidt; Horst Seibicke, both of Buehl-Altschweier; Eckhard Ursel, Buehl, all of Fed. Rep. of Germany

[73] Assignee: Robert Bosch GmbH, Stuttgart, Fed. Rep. of Germany

[21] Appl. No.: 441,796

[22] Filed: Nov. 15, 1982

[30] Foreign Application Priority Data

Nov. 20, 1981 [DE] Fed. Rep. of Germany ....... 3146022
Aug. 18, 1982 [DE] Fed. Rep. of Germany ....... 3230695

[51] Int. Cl.$^3$ ............................................. B60S 1/26
[52] U.S. Cl. ..................................... 15/250.16; 74/75
[58] Field of Search ............. 15/250.16, 250.17, 250.3; 74/70, 75, 52, 600

[56] References Cited

U.S. PATENT DOCUMENTS

| 3,115,598 | 12/1963 | Ziegler | 74/70 X |
| 3,197,796 | 8/1965 | Masumikato et al. | 15/250.17 |
| 3,465,378 | 9/1969 | Kolb | 15/250.17 |
| 3,717,048 | 2/1973 | Carpenter | 15/250.17 X |

*Primary Examiner*—Peter Feldman

*Attorney, Agent, or Firm*—Michael J. Striker

[57] ABSTRACT

A wiping arrangement for windows of power vehicles has a wiping element with a wiper shaft, rotary direction-reversible drive having a rotatable driven element, swinging drive with a driving element rotatable about a center and provided with a gripping element and a guide, and connecting the driven element of said rotary drive with the wiper shaft of said wiping element so that when the driven element rotates in one direction the wiping element covers a circular, segment-shaped wiping field and performs wiping step over a predetermined wiping field, and when the driven element rotates in a reverse direction the gripping element arranged on the driving element of the swinging drive means moves radially away from the center with the aid of the guide and thereby the wiping element is transported to a parking position lying beyond the wiping field, a structural element connected and rotating together with the gripping element during the wiping step, but uncoupled from the gripping element for the radial movement of the latter, wherein the structural element is provided with a blocking element for blocking the structural element in position of the rotary direction reverse, and with a guiding element arranged on the structural element.

39 Claims, 16 Drawing Figures

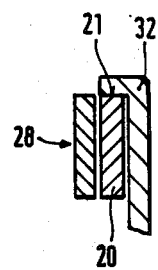
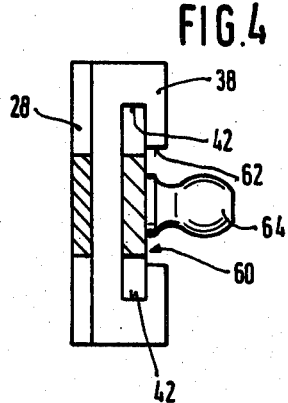
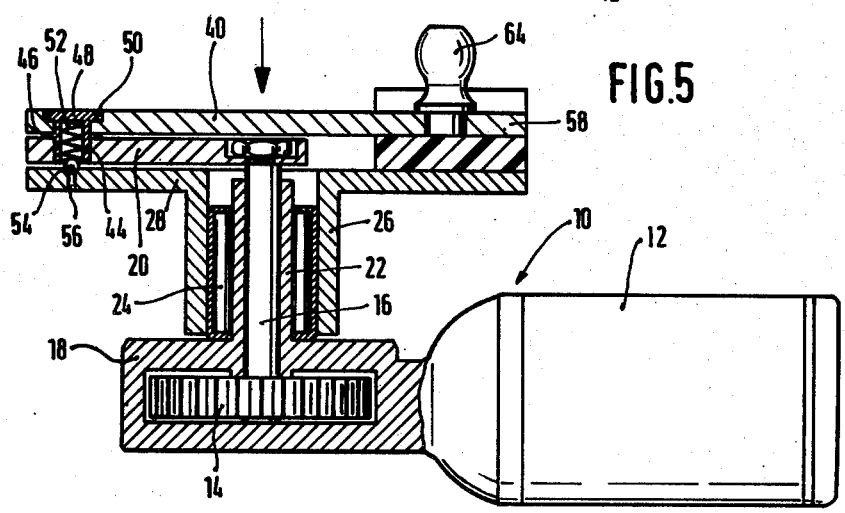
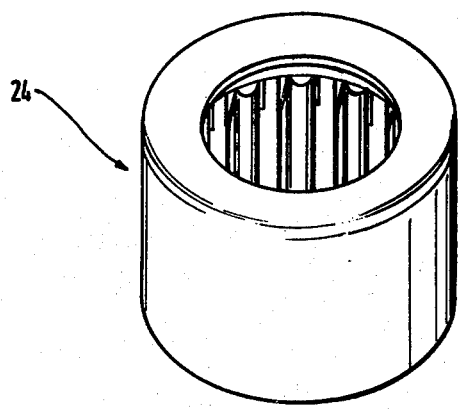

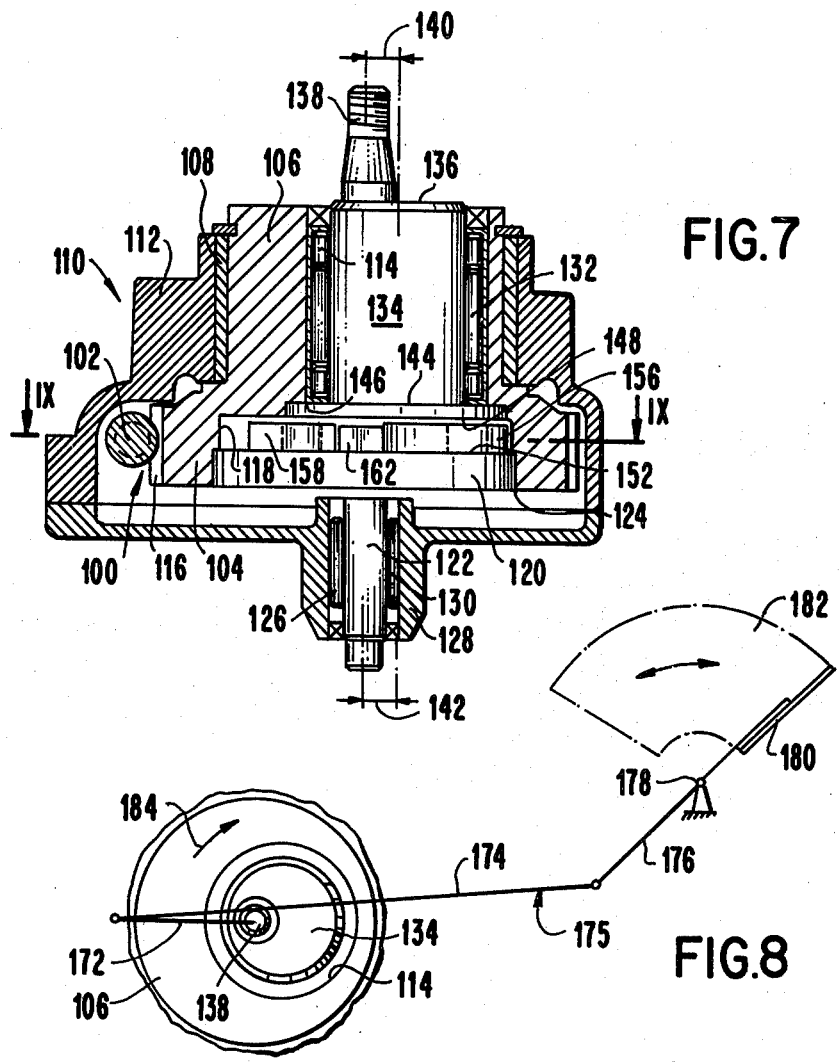
FIG.7
FIG.8
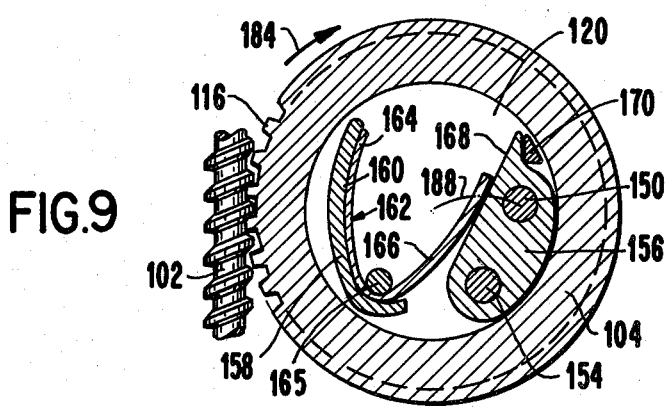
FIG.9

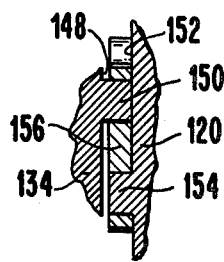
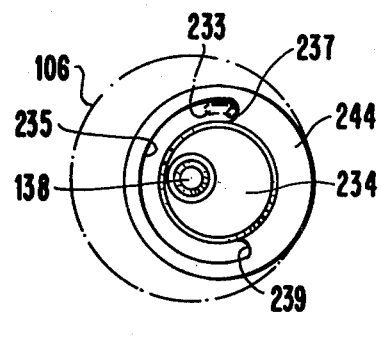
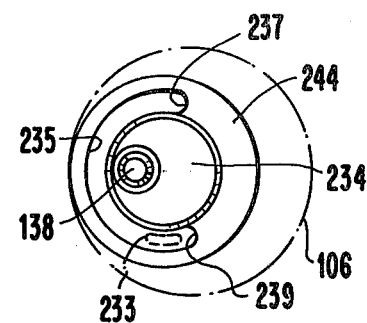
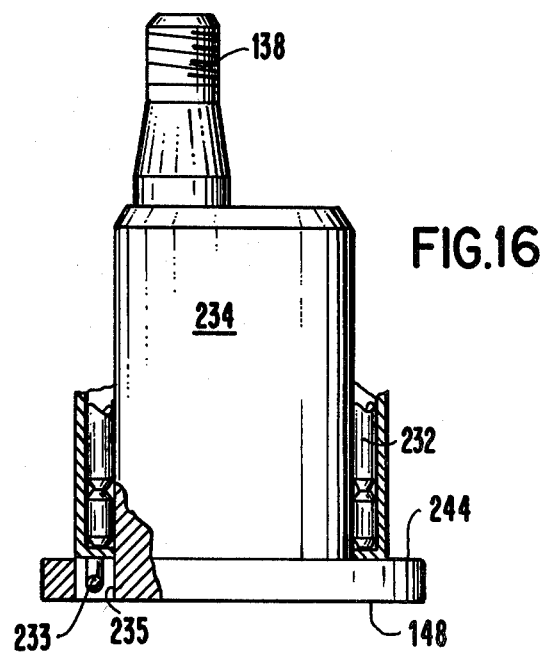

WIPING ARRANGEMENT FOR WINDOWS OF POWER VEHICLES

BACKGROUND OF THE INVENTION

The present invention relates to a wiping arrangement for windows of power vehicles.

Wiping arrangement of the above-mentioned general type are known in the art. A known arrangement has a rotary gripping element of a drive, provided with a spiral groove extending approximately over 360°. A drive element forms a slide block for a movement-transmitting means arranged between the drive and a wiper. During a wiping step the slide block is taken along by an inwardly lying groove end. After a rotation reverse of the drive, the slide block moves in the groove from its center of rotation until it abuts against another outer groove end. By this movement which is actuated by a stationary guide, the wiper is swung to its parking position. When the wiper must start to move again, the drive element must perform fast a complete rotation, until the wiper is put in operation. This great idle running and a delay in the wiping step connected therewith are undesirable and dangerous. In the wiping arrangements with non-reversible drives this additional movement of the gripping element in carried out by arrangement of catches and the like, loaded by electromagnetically operating uncoupling elements.

SUMMARY OF THE INVENTION

Accordingly, it is an object of the present invention to provide a wiping arrangement for windows of power vehicles, which avoids the disadvantages of the prior art.

More particularly, it is an object of the present invention to provide a wiping arrangement for windows of power vehicles, which has a small idle stroke to swing a wiper to its parking position, and as a result of this an idle stroke upon switching on of the arrangement is small and a wiping step can start short after the switching on.

In keeping with these objects and with others which will become apparent hereinafter, one feature of the present invention resides, briefly stated, in a wiping arrangement for windows of power vehicles having a wiping element with a wiper shaft, rotary direction-reversible drive means with a rotatable driven element, swinging drive means having a driving element rotatable about a center and provided with a gripping element and guide, which swinging drive means connect the driven element of the rotary drive means with the wiper shaft of the wiping element so that when the driven element rotates in one direction the wiping element covers a circular-segment-shaped wiping field and performs wiping step over this wiping field, and when the driven element rotates in a reverse direction the gripping element arranged on said driving element of the swinging drive means moves radially away from the center with the aid of the guide and thereby the wiping element is transported to a parking position lying beyond the wiping field, and a structural element connected and rotating together with the gripping element during the wiping step, but uncoupled from the gripping element for the radial movement of the latter, wherein the structural element is provided with blocking means for blocking the structural element in position of the rotary direction reverse, and with guiding means arranged on the structural element.

When in accordance with the present invention the structural element is provided with the blocking means for blocking the same in position of the rotary direction reverse, and with the guiding means arranged on the structural element, the above-mentioned objects of the invention are attained.

In accordance with another advantageous feature of the present invention, the blocking means includes a free-running bearing which allows rotary movement of the structural element required for the wiping step, but fixedly holds the same when the rotary direction of the drive is reversed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a view showing a section of the inventive wiping arrangement, taken along the line III—III in FIG. 1;

FIG. 4 is a view showing a section of the inventive wiping arrangement, taken along the line IV—IV in FIG. 1;

FIG. 5 is a view showing a section of the inventive wiping arrangement, taken along the line V—V in FIG. 1;

FIG. 6 is a view showing a free-running bearing of the inventive wiping arrangement;

FIG. 7 is a view showing a section of the wiping arrangement in accordance with another embodiment of the present invention;

FIG. 8 is a partial plan view of the wiping arrangement of FIG. 7;

FIG. 9 is a view showing a section of the wiping arrangement, taken along the line IX—IX in FIG. 7;

FIG. 13 is a view showing a section taken along the line XIII—XIII in FIG. 10;

FIG. 14 is a plan view of a gripping element for a cylinder of a swinging drive of the wiping arrangement in accordance with a further embodiment of the invention in an operational position of FIG. 8;

FIG. 15 is a view showing the cylinder of FIG. 14 in an operational position of FIG. 11; and FIG. 16 is a partial view of the cylinder with a switchable free-running bearing in the region of a switching lever.

DESCRIPTION OF A PREFERRED EMBODIMENT

Figure 1:
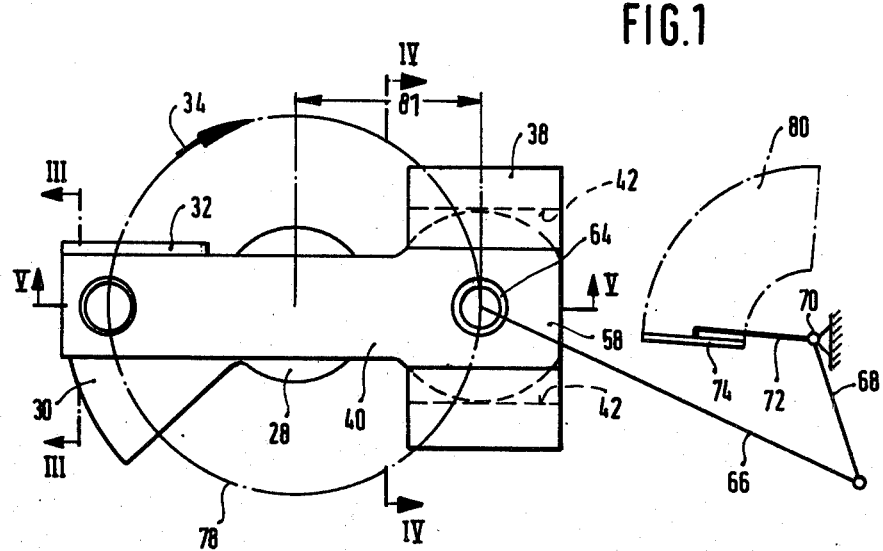
FIG. 1 is a plan view schematically showing an arrangement for wiping windows of power vehicles in accordance with the present invention in an operational position allowing a normal wiping step.

A structural element 28 has a lug 32 projecting upwardly at a right angle and extending to the region of a crank 20. The lug 32 forms a driver against which the crank 20 strikes when it moves in a clockwise direction identified by the arrow 34. A block 38 composed of synthetic plastic material is mounted on the other end 36 of the structural element 28.

An arm 40 is pivotally mounted near the free end of the crank 20 and is elongated. The free end of the arm 40 is guided in a guide 42 formed in the block 38. The hinged connection between the crank 20 and the arm 40 is carried out by a tubular pin 44 whose one end is pressed in an opening provided in the crank 20. The other end of the pin 44 is rotatably supported in an opening of the arm 40. The pin 44 has in its central region an annular collar 46 which holds the crank 20 and the arm 40 at a distance from one another. For securing the arm 40 in axial direction of the pin 44, the pin 44 has a cap 48 which lies in a recess 50 of the arm.

A pressure spring 52 is arranged with prestress in a blind hole of the tubular pin 44 and presses an arresting ball 54 into an associated arresting recess 56 to an operative position. The arresting recess 56 is formed by an opening in the structural element 28. An end 58 of the arm 40, which is guided in the block 38 is circular. The diameter of the opposite sides of this end 58 is greater than the width of the remaining portion of the arm 40. The head-shaped widening of the end 58 lies with matching in a recess 60 formed as a sliding guide 42, as shown in FIG. 4. Because of the circular shape of a head edge 59, the arm 40 is supported in the guide 42 in a sliding and simultaneously pivotable manner.

The recess 60 has a T-shaped cross section. It has in its central region a cutout 62 through which a gripping element 64 which is formed as a ball pin passes. The gripping element 64 is fixedly connected with the head-shaped end 58 of the arm 40. A driving rod 66 of a swinging drive of a wiping device engages with the pin 64. The other end of the driving rod 66 is pivotally connected with a swinging arm 68 which in turn is fixedly connected with a wiper shaft 70. A wiper arm 72 is mounted on the wiper shaft 70 and has a free end with which a wiping element 74 is pivotally connected. The wiper arm 72 and the wiping element 74 together form a wiper of the wiping device.

During operation of the wiping device, an electric motor 12 of a drive 10 drives a driven shaft 16 so that the crank 20 rotates in a direction identified by the arrow 34 in FIG. 1 or a clockwise direction. A free-running bearing 24 is formed so that the structural element 28 can also rotate in this direction when a front face 21 of the crank 20 as considered in the clockwise direction, strikes against the driver 32 of the structural element 28. After driving of the structural element 28 by the crank 20 in the direction of the arrow 34, and driving of the arm 40 via the hinge pin 44 with the crank 20, on the one hand, and at the head-shaped end 58 in the block 38, the arm 40 rotates also in the direction of the arrow 34. Thus, the whole system runs including the driving shaft 16, the crank 20, the structural element 28 with the sleeve 26 and the arm 40 in the direction of the arrow 34. The pin 64 runs over an orbit 78 with a radius 80. The rotary movement of the pin 64 is transmitted via the swinging drive 66, 68 to the wiper shaft 70, so that the wiping element 74 covers a circular segment-shaped wiping field 80 of a not-shown window.

Figure 2:
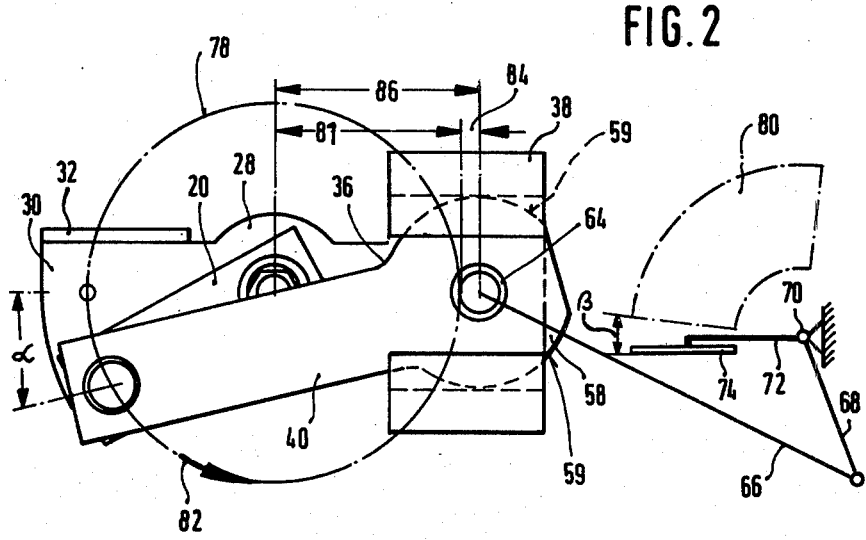
FIG. 2 is a view substantially corresponding to the view of FIG. 1, but showing the wiping arrangement in an operational position when a wiper is located outside of a wiping field.

When the wiping device is stopped, the wiper 72, 74 must be moved to a parking position located outside of the wiping field 80. After stopping of the electric motor 12 the direction of rotation of the electric motor is reversed by a known per se switching device, so that the crank rotates in a counterclockwise direction in accordance with the arrow 82 in FIG. 2. In this direction of rotation the face 21 of the crank 20 moves away of the driver 32 of the structural element 28. Both these structural elements are thus uncoupled. The free-running bearing 24 prevent driving of the structural element 28 by friction, since the free-running bearing 24 blocks this direction of rotation for the sleeve 26 and thereby for the structural element 28. Thereby also the block 38 and thereby the guide 42 remain arrested. When the crank 20 is now turned by a predetermined angle, here by approximately 15°, in the counterclockwise direction, the head-shaped end 58 of the arm 40 moves away of the orbit 81 by a distance 84. This movement takes place radially, as considered relative to the axis of rotation of the driving shaft. The distance 84 depends upon the angle covered by the return swinging movement of the crank 20. Because of the displacement of the pin 64 by the distance 84, its distance from the axis of rotation of the driven shaft 16 amounts to a value which corresponds to a distance 86 shown in FIG. 2. This displacement of the pin 64 is transmitted via the driving rod 66 and the swinging arm 68 to the wiper shaft 70 which performs an additional swinging movement amounting to the angle shown in FIG. 2. This additional swinging movement forces the wiper 72, 74 to be located outside of the wiping field 80.

This displacing movement of the ball stud 64 is attained because the guide 60 which is held fixedly during the operation of the wiper drive is fixed via the pin 64 in the position of rotary direction reverse. The return movement of the crank 20 is thereby converted into a linear displacement during the operation of the guide, and the linear displacement increases the distance of the pin 64 from the rotary axis of the driven shaft 16 by the distance 84. The securing of the guide is taken over in an especially advantageous manner by the free-running bearing 24. The arresting by 54, 56 between the structural element 28 and the crank 20 prevents that during the wiper operation when in the reverse position of the wiper the swinging drive 66, 68 and all subsequent element 70, 72, 74 remain immovable for a moment and the ball stud 64 is in a dead point, the structural element 28 or its driven because of the moved masses move away of the crank 20 and produce a situation shown in FIG. 2. In such a case wiping element 74 in the reverse position spaced from the parking position of the wiper 72, 74 would move outwardly over the edge of the window.

In another embodiment of the invention a reducing transmission 100 formed as a worm transmission is arranged after the electric motor. A worm shaft 102 of the worm transmission 100 is formed as an extension of a rotor shaft of the motor. The worm shaft 102 engages with a worm wheel 104 having a tubular portion 106. The outer surface of the tubular portion 106 is guided in a bearing 108 arranged in a housing 112 which belongs to a drive device 110. The tubular portion 106 of the worm wheel 104 is provided with a bearing opening 114 extending in direction of the axis of rotation of the worm wheel. The bearing opening 114 is, however, eccentrical to the outer surface of the tubular portion 106 arranged in the bearing 108. The worm wheel 104 has at its side facing away of the portion 106, a depression 118 which is concentrical to a toothing 116. A disc-shaped structural element 120 is arranged in the depression 118.

The structural element 120 is provided with a central bearing pin 122 located at its side facing away of the depression 118. The bearing pin 122 is guided in a guiding opening 126 of a housing part 128 of the housing 112, as shown in FIG. 7. The guiding opening 126 is concentrical to the bearing 108 of the worm wheel 104. Between the guiding opening 126 in the housing part 128 and the bearing pin 122 of the disc-shaped structural member 120, a first free-running bearing 130 is located. The free-running bearing is guided in the guiding opening 126 and receives the bearing pin 122. A second free running bearing 132 is arranged in the bearing opening 114 which opens in the depression 118. The second free-running bearing receives a cylinder 134.

The cylinder 134 at its end face 136 facing away of the disc-shaped structural element 120, is provided with a portion formed as a threaded pin 138. The threaded pin 138 is eccentrical to the axis of the cylinder 134. An eccentricity 140 of the threaded pin 138 relative to the axis of the cylinder 134 corresponds to an eccentricity 142 of the bearing opening 114 of the cylinder 134 in the tubular portion 106. As can be understood from the preceding description, the free-running bearing 130 and 132 have axes of rotation which are parallel to one another. Both free-running bearings are however arranged so that they are freely rotatable in opposite directions. The cylindrical 134 has at its end facing away of a threaded pin 138, an annular shoulder 144 associated with a counter shoulder 146 of the tubular portion 106. The annular shoulder 144 of the cylinder 134 prevent thereby, in cooperation with the counter shoulder 146 outward travelling of the cylinder from the bearing opening 114 or from the free-running bearing 132.

The cylinder 134 is provided at its end face 148 facing toward the disc-shaped structural element 120, with a bearing pin 150. A bearing pin 154 is similarly arranged on the disc-shaped structural element 120, at its face 152 facing toward the cylinder 134. Both bearing pins 150 and 154 have axes parallel to one another and are seated, relative to the axes of rotation of their carriers (the cylinder 134 and the disc-shaped structural element 120) eccentrically. Both bearing pins 150 and 154 form hinge points for a guiding lever 156 located between the end face 148 of the cylinder 134 and the face 152 of the disc-shaped structural element 120.

The disc-shaped structural element 120 further has at its face 152 a substantially L-shaped projection 158. The latter has a supporting shoulder 160 for a leg spring 162 composed of a spring steel. One leg 164 of the leg spring 162 lies on the supporting shoulder 160, whereas the other leg 166 abuts with prestress against a flank 168 of the guiding lever 156, the flank facing toward the supporting shoulder 160. The leg spring 162 is held on the supporting shoulder 160 by a safety pin 165 in its predetermined position.

For simplifying the mounting of the guiding lever 156 and the leg spring 162, a cam 170 is arranged on the face 152 of the disc-shaped structural element 120. The cam 170 guarantees safety of the spring-loaded guiding lever 156 in its above described mounting position. As can be seen from FIG. 8, a crank 172 is mounted on the threaded pin 138 and has a free end pivotally connected with a driving rod 174. The other end of the driving rod 174 is pivotally connected with a swinging arm 176 mounted on a wiper arm 178 fixedly connected with the frame. A wiping element 180 is arranged on the wiper shaft 178 and covers during operation of the wiping device a circular, segment-shaped wiping field 182.

The operational position of the guiding lever 156 shown in FIG. 9 is provided when the driving device 110 actuates the swinging drive movement for the wiping element 180.

In operation of the wiping device, the worm shaft 102 driven by a not-shown electric motor drives the worm wheel 104 and thereby also the tubular portion 106. The worm wheel rotates thereby together with the tubular portion in the bearing 108 of the housing part 112. The direction of rotation of the worm wheel 104 is identified by the arrow 184 in FIG. 9. The cylinder 134 rotates together with the worm wheel, while the free-running bearing 132 is blocked in the direction of rotation of the arrow 184. The disc-shaped structural element 120 also rotates together with the worm wheel 104, since it is connected via both bearing pins 150, 154 and the guiding lever 156 with the cylinder 134, as shown in FIG. 13. The free-running bearing 132 must be so formed that it allows a free rotation of the bearing pin 122 in direction of the arrow 184. Both free-running bearings 130 and 132 arranged identically relative the direction of their axes of rotation are freely rotatable in opposite directions. As can be seen from FIGS. 7 and 8, the cylinder 134 is located in a position in which the longitudinal axis of threaded pin 138 forms an extension of the axis of the bearing pin 122. The crank 172 (FIG. 8), mounted on the threaded pin 138, rotates together with the latter in direction of the arrow 184. This rotary movement is transformed via the driving rod 174 and the swinging arm 176 into a swinging movement. Thereby, the wiping element 180 covers, during swinging, the circular segment-shaped wiping field 182. The crank 172 forms together with the driving arm 174 and the swinging arm 176 the swinging drive 175.

During the wiping operation the force flux flows from the worm shaft 102 via the worm wheel 104, the tubular portion 106, the blocked free-running bearing 132, the cylinder 134 and the threaded stud 138 to the swinging drive 175. The disc-shaped structural element 120 and the bearing pin 122 connected therewith are taken along via the guide formed by the bearing pin 150 connected with the cylinder 134, the guiding lever 156 and the bearing pin 154 connected with the disc-shaped structural element 120.

When the swinging device is stopped and the wiping element 180 must be brought to a parking position offset relative to the wiping field (FIG. 11), the drive motor is switched off and the wiping element runs to the end position shown in FIG. 8. In this position the direction of rotation of the drive motor is reversed by known switching means. The worm wheel 104 rotates now in an opposite direction, and particularly in direction identified by the arrow 186 in FIG. 12. During this rotation the free-running bearing 132 opens and the free-running bearing 130 closes. When now the worm wheel 104 and therewith also the tubular portion 106 rotate in direction of the arrow 186, but the disc-shaped structural element 120 is fixed via the bearing pin 122 by the free-running bearing 130, a relative movement between the cylinder 134 and the disc-shaped structural element 120 take place. By this movement, the bearing pin 150 of the cylinder 134 moves relative to the fixedly held bearing pin 154 of the disc-shaped structural element 120 along a curve 188 (FIG. 9), in a counterclockwise direction. The guiding lever 156 swings around the bearing pin 154 against the force of the leg spring 162. With this swinging, a rotation of the cylinder 134 takes place from the operation position shown in FIG. 7 to the position in accordance with FIG. 11.

Figure 11:
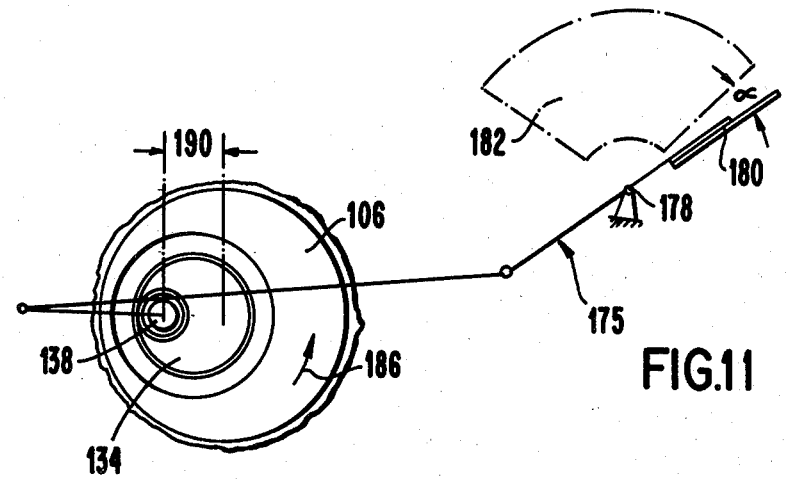
FIG. 11 is a plan view of the drive of the wiping arrangement shown in FIG. 10.
Figure 12:
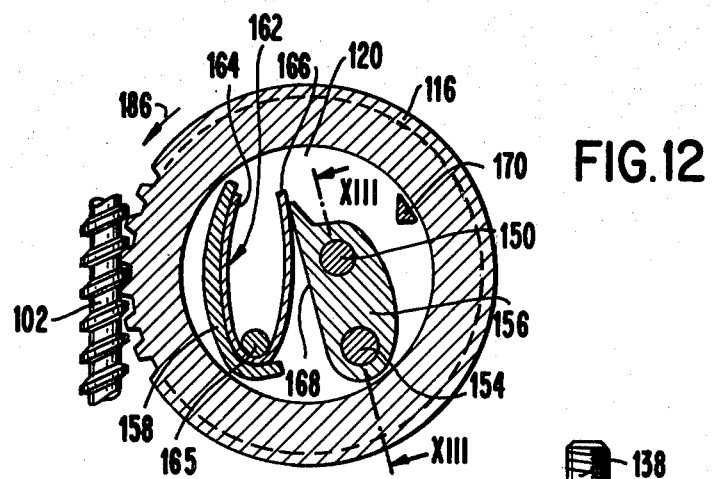
FIG. 12 is a view showing a section taken along the XII—XII in FIG. 10.
Figure 10:
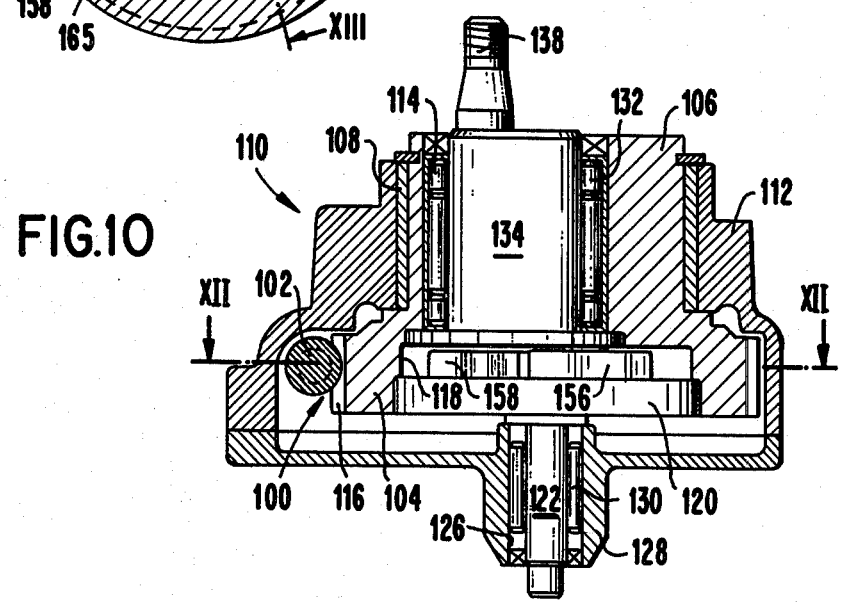
FIG. 10 is a view showing a section of the drive of the wiping arrangement of FIG. 7 in a parking position.

From comparison of FIGS. 8 and 11 with one another it can be recognized that the threaded pin 138 now travels out of the operational position of its alignment with the axis of rotation of the bearing pin 122, by a distance 190 shown in FIG. 11 and in correspondence with the double eccentricity 140 of the threaded pin 138 to the longitudinal axis of the cylinder 134. With the reverse of the direction of rotation, uncoupling of the threaded pin serving as a gripping element of the swinging drive, from the disc-shaped structural element 120 takes place, which structural element 120 is fixedly held by the free-running bearing 130 in its position of the rotary direction reverse. This "uncoupling" means here is a lifting of the active connection in the working position between the threaded pin 138 and the structural element 120. The guide through which the displacement of the threaded stud 138 by the distance 190 is provided is mounted on the disc-shaped structural element 120. With the displacement of the threaded pin 138 by the distance 190, the driving rod 174 is so compensated that via the swinging arm 176 an additional swinging angle at the wiping element 180 is produced. The wiping element 180 lies now in its so-called parking position shown in FIG. 11.

The transport of the wiping element 180 to its parking position is actuated by the relative movement between the disc-shaped structural element 120 and the worm wheel 104 or the portion 106 connected therewith, since the guides 150, 154, 156 force a guided relative rotary movement between the cylinder 134 and the worm wheel.

It can be seen that in this embodiment of the invention, for transporting the wiping element to a parking position, the structural element 120 is fixedly held by a blocking device 130 in the position of the rotary reverse direction, the guides 150, 154, 156 are arranged on the structural element 120 or connected therewith.

When the drive device is again brought into operation, the worm wheel 104 or the portion 106 rotates further in direction of the arrow 186. The guiding lever 156 thereby swings again to its position shown in FIG. 9. In this position shown in FIGS. 7-9 the drive motor changes poles, so that the above-described wiping operation takes place.

An immediate running in direction of the arrow 184 can be actuated by the arrangement of a usual switchable free-running bearing 232 instead of the free-running bearing 132. Such a free-running bearing has at its end face a switching lever 233 extending beyond the same and movable over a predetermined angle in the circumferential direction of the free-running bearing. In one operation position of the switching lever the free-running bearing performs the bearing functions; in other words, it rotates freely in both directions. In another switching position the switching lever 233 blocks the free-running bearing in its direction of rotation.

The free-running bearing is assembled so that the switching lever 233 has to an annular shoulder 244 a cylinder 234. The latter is received in a sickle-shaped cutout 235, shown in FIGS. 14-16, in the annular shoulder which surrounds the cylinder 234 over more than 180°. One end edge 237 of the cutout 235 serves as an actuating shoulder for the switching lever 233 which is arranged so that the free-running bearing 232 is held blocked in the position associated with the wiping operation. The action of the free-running bearing 232 exactly corresponds to the free-running bearing 132 of the previously described embodiment.

When the window wiper 180 must be transported from its end position in accordance with FIG. 8 to its parking position in accordance with FIG. 11, the drive motor changes poles so that the worm wheel 108 rotates in direction of the arrow 186. Thereby the actuating shoulder 237 of the cutout 235 of the switching lever 233 is released, so that by the soring mechanism in the free-running bearing the clamping function is lifted. Therefore the above-described transport of the window wiper 180 in its parking position shown in FIG. 11 is possible. The switching lever 233 runs in the sickle-shaped cutout 235 to a position shown in FIG. 15 in which after more than 180° at a distance from the other end edge 239 of the cutout 235 it comes to a stop, while the drive motor is switched off.

When the drive motor is started again by the respective switching means it runs so that the worm wheel 104 rotates in direction of the arrow 184. The switching lever 233 now runs on the cutout 235 until abutment against the actuating shoulder 237 whereby blocking of the free-running bearing is provided and the wiping operation takes place. Until switching of the free-running bearing 232, the wiping element 180 runs from its parking position of FIG. 11 to its end position of FIG. 8. It covers the additional angle α. Thereby the leg spring 162 is forced, similarly to the embodiment of FIGS. 7-13, for an orderly return of the guiding lever 156 to move from its rotational position of FIG. 12 to its position shown in FIG. 9.

It is understood that this embodiment of the present invention makes possible running of the wiping element 180 from the parking position with direct transition to the wiping operation.

It will be understood that each of the elements described above, or two or more together, may also find a useful application in other types of constructions differing from the types described above.

While the invention has been illustrated and described as embodied in a wiping arrangement for windows of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A wiping arrangement for windows of power vehicles, comprising
a wiping element with a wiper shaft;
rotary direction reversible drive means having a rotatable driven element;
swinging drive means having a driving element rotatable about a center and provided with a gripping element and a guide, said swinging drive means connecting said driven element of said rotary drive means with said wiper shaft of said wiping element so that when said driven element rotates in one direction said wiping element covers a circular, segment-shaped wiping field and performs wiping step over the wiping field, and when said driven element rotates in a reverse direction said gripping element arranged on said driving element of said swinging drive means moves radially away from said center with the aid of said guide and thereby said wiping element is transported to a parking position lying beyond the wiping field;

a structural element connected and rotating together with said gripping element during the wiping step, but uncoupled from said gripping element for the radial movement of the latter, said structural element being provided with blocking means for blocking said structural element in position of the rotary direction reverse, and with guiding means arranged on said structural element.

2. A wiping arrangement as defined in claim 1, wherein said rotary drive means includes a direction-reversible electric motor.

3. A wiping arrangement as defined in claim 1, wherein said blocking means of said structural element includes a free-running bearing.

4. A wiping arrangement as defined in claim 1, wherein said swinging drive means has a stationary hub and a sleeve connected with said structural element, said free-running bearing being arranged on said hub and surrounded by said sleeve.

5. A wiping arrangement as defined in claim 4, wherein said driven element of said rotary drive means is formed as a driven shaft, said hub being formed as a bearing bush supporting said shaft.

6. A wiping arrangement as defined in claim 5, wherein said rotary drive means further includes a crank mounted on said driven shaft, said structural element having a driver engaging said crank during the wiping step.

7. A wiping arrangement as defined in claim 6, wherein said crank has a front face as considered in direction of rotation, said driver being a lug formed on said structural element and bent, said front face of said crank striking against said tongue.

8. A wiping arrangement as defined in claim 7, wherein said driving element of said swinging drive means if formed as an arm having two ends, said crank having one end pivotally connected with one of said ends of said arm, the other end of said arm being provided with said gripping element and cooperating with said guide, said guide being rotatable.

9. A wiping arrangement as defined in claim 8, wherein said gripping element of said swinging drive means is formed as a hinge half.

10. A wiping arrangement as defined in claim 8, wherein said guide is formed in a block connected with said structural element and having an opening, said other end of said arm matching to and being displaceable in said opening of said block.

11. A wiping arrangement as defined in claim 10, wherein said block is composed of a synthetic plastic material.

12. A wiping arrangement as defined in claim 11, wherein said other end of said arm displaceable in said opening of said block has side regions and is formed circular in at least said side regions.

13. A wiping arrangement as defined in claim 12; and further comprising means for arresting said crank and said structural element.

14. A wiping arrangement as defined in claim 13, wherein said swinging drive means includes a hinge pivotally connecting said one end of said crank with said one end of said arm, said arresting means being arranged in the region of said hinge.

15. A wiping arrangement as defined in claim 13, wherein said arresting means includes a spring-loaded ball arranged in said crank, and an arresting recess provided in said structural element and associated with said ball.

16. A wiping arrangement as defined in claim 15; and further comprising means for arresting said crank and said structural element, said hinge having a blind hole, said arresting means including a spring which acts upon said ball and is located in said blind hole.

17. A wiping arrangement as defined in claim 1, wherein said rotary drive means having a reducing transmission having a wheel which is operatively connected with said swinging drive means, said structural element being rotatably supported and cooperating with said transmission wheel.

18. A wiping arrangement as defined in claim 17, wherein said blocking means includes a free-running bearing which freely rotates during the wiping step and support said structural element.

19. A wiping arrangement as defined in claim 18, wherein said rotary drive means has a housing part provided with a support, said structural element having a bearing pin, and said free-running bearing receiving said bearing pin of said structural element and being arranged in said support of said housing part.

20. A wiping arrangement as defined in claim 19, wherein said structural element provided with said bearing pin is disc-shaped.

21. A wiping arrangement as defined in claim 20, wherein said transmission wheel has an axis of rotation, said disc-shaped structural element being arranged concentrically to said transmission wheel.

22. A wiping arrangement as defined in claim 18, wherein rotary drive means has a housing part, said transmission wheel having a side facing away of said structural element and being provided at its side with a tubular projection received in said housing part.

23. A wiping arrangement as defined in claim 22, wherein said tubular projection has an opening, said transmission wheel having a depression in which said opening of said projection opens and a toothing arranged excentrically to said depression.

24. A wiping arrangement as defined in claim 22, wherein said transmission further includes a cylinder supported on said tubular projection and having an end face which faces away of said structural element and is provided with said gripping element.

25. A wiping arrangement as defined in claim 24, wherein said gripping element arranged on said end face of said cylinder is formed as a threaded pin.

26. A wiping arrangement as defined in claim 25, wherein said cylinder has an axis, said threaded pin being arranged excentrically relative to said axis of said cylinder.

27. A wiping arrangement as defined in claim 26, wherein said tubular projection has an eccentrical bearing opening for supporting said cylinder, the eccentricity of said threaded pin and the eccentrically of said bearing opening corresponding to one another.

28. A wiping arrangement as defined in claim 27; and further comprising a second free-running bearing arranged in said bearing opening and receiving said cylinder.

29. A wiping arrangement as defined in claim 28, wherein said first-mentioned and said second free-running bearings have parallel axes and are freely rotatable in opposite directions.

30. A wiping arrangement as defined in claim 24, wherein said cylinder has a face facing toward said structural element and provided with a bearing pin, said structural element having a face facing toward said cylinder and also provided with a bearing pin, said bearing pins having supports and being arranged eccentrically in the latter; and further comprising a guiding lever connecting said bearing pins with one another.

31. A wiping arrangement as defined in claim 30; and further comprising a prestressed leg spring urging said guiding lever in a first operational position, said face of said structural element facing toward said cylinder having a supporting shoulder for said leg spring.

32. A wiping arrangement as defined in claim 31; and further comprising a return spring arranged so that said guiding lever is swingable to a second operational position against force of said return soring.

33. A wiping arrangement as defined in claim 32, wherein said return spring is formed as a leg spring.

34. A wiping arrangement as defined in claim 33, wherein said guiding level and said springs are arranged so that said first operational position of said guiding lever corresponds to the wiping step, and said second operational position of said guiding lever corresponds to the parking position of said wiping element.

35. A wiping arrangement as defined in claim 25, wherein said cylinder has an end facing away of said threaded pin and is provided at said end with an annular shoulder, said tubular projection having a counter shoulder associated with said annular shoulder.

36. A wiping arrangement as defined in claim 28, and further comprising mechanically actuatable switching means for said second free-running bearing.

37. A wiping arrangement as defined in claim 36; and further comprising a switching lever extending at and end side outwardly beyond said second free-running bearing and actuating said switching means.

38. A wiping arrangement as defined in claim 38; and further comprising means forming an actuating shoulder with which said switching lever cooperates.

39. A wiping arrangement as defined in claim 38, wherein said cylinder has an annular shoulder provided with a sickle-shaped cutout, said switching lever engaging into said cutout, and said cutout having an end edge forming said actuating shoulder.

* * * * *